United States Patent
Niwa

(10) Patent No.: US 7,701,504 B2
(45) Date of Patent: Apr. 20, 2010

(54) IMAGE PICKUP APPARATUS WITH OPERATING MEMBER HAVING FIRST AND SECOND POSITIONS FOR IMAGE PICKUP AND REPRODUCTION MODES AND WITH A FORCED THIRD POSITION WHEN NOT OPERATED BY A USER

(75) Inventor: Chiyumi Niwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 10/650,223

(22) Filed: Aug. 28, 2003

(65) Prior Publication Data

US 2004/0051807 A1   Mar. 18, 2004

(30) Foreign Application Priority Data

Sep. 4, 2002   (JP) .............................. 2002-258830

(51) Int. Cl.
*H04N 5/225*  (2006.01)
*H04N 3/16*  (2006.01)
(52) U.S. Cl. ...................... 348/374; 348/231.6; 200/339
(58) Field of Classification Search ................ 348/374, 348/236.1, 373, 207.99
See application file for complete search history.

(56) References Cited

U.S. PATENT DOCUMENTS

| 5,329,163 | A | * | 7/1994 | Satoh et al. ................. 307/10.1 |
| 5,469,125 | A | * | 11/1995 | Shigemoto et al. ........... 338/162 |
| 5,566,087 | A | * | 10/1996 | Voigt et al. .................. 700/275 |
| 6,262,767 | B1 | * | 7/2001 | Wakui .................... 348/211.99 |
| 6,297,795 | B1 | * | 10/2001 | Kato et al. ................... 345/684 |
| 6,566,619 | B2 | * | 5/2003 | Gillman et al. ............. 200/339 |
| 6,613,989 | B2 | * | 9/2003 | Tsuda et al. .................... 200/4 |
| 7,042,510 | B2 | * | 5/2006 | Kurahashi ................... 348/373 |
| 7,098,946 | B1 | * | 8/2006 | Koseki et al. ............ 348/229.1 |
| 2002/0008765 | A1 | * | 1/2002 | Ejima et al. ................. 348/239 |
| 2002/0036702 | A1 | * | 3/2002 | Ohnogi .................. 348/333.05 |
| 2002/0089591 | A1 | * | 7/2002 | Kurahashi ................... 348/207 |
| 2003/0206240 | A1 | * | 11/2003 | Hyodo et al. .......... 348/333.03 |
| 2005/0225652 | A1 | * | 10/2005 | Kudo .................... 348/231.99 |

FOREIGN PATENT DOCUMENTS

| CN | 1348303 | 5/2002 |
| JP | 2001-326849 | 11/2001 |

* cited by examiner

*Primary Examiner*—Sinh Tran
*Assistant Examiner*—Hung H Lam
(74) *Attorney, Agent, or Firm*—Cowan, Liebowitz & Latman, P.C.

(57) ABSTRACT

In order to make it possible to perform the starting or the changing of photographing, recording and reproducing modes easily and to eliminate walls between the modes, an image pickup apparatus includes a first mode for recording a photographed image on a record medium as an image file, a second mode for reproducing the image file, and an operation member which can switch to each mode by different operation methods, wherein the operation member returns to its original state after the performance of an operation.

7 Claims, 11 Drawing Sheets

| FIG. 1A | FIG. 1B |

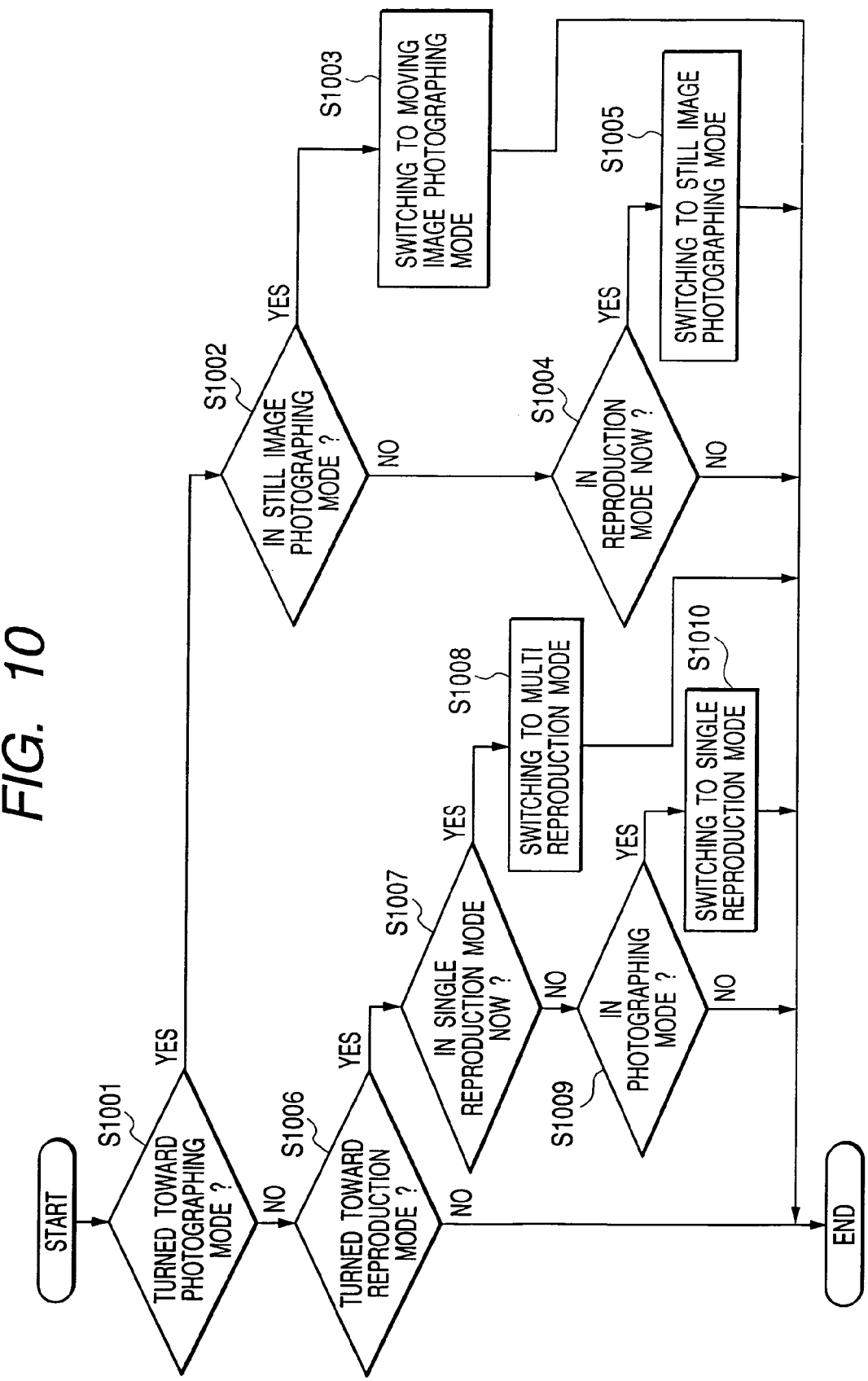

IMAGE PICKUP APPARATUS WITH OPERATING MEMBER HAVING FIRST AND SECOND POSITIONS FOR IMAGE PICKUP AND REPRODUCTION MODES AND WITH A FORCED THIRD POSITION WHEN NOT OPERATED BY A USER

BACKGROUND OF THE INVENTION

1. Field of the Invention

The present invention relates to an image pickup apparatus for picking up an object image, a control method of the image pickup apparatus, and a storage medium.

2. Description of Related Art

In a conventional image pickup apparatus such as a digital camera or the like, a mode change operation member and an electric power switch are provided separately from each other. When the electric power is turned on, it is required to operate both of the electric power switch and the mode change operation member.

Moreover, the conventional image pickup apparatus is configured to withdraw a lens barrel immediately after a change of its mode from a photographing mode to a reproduction mode.

Consequently, the conventional image pickup apparatus has the problems such that it is impossible to perform the mode change and the turning on of the electric power at one operation, and that it is impossible to perform photographing immediately after a mode change to the photographing mode.

SUMMARY OF THE INVENTION

The present invention was made in view of the above-mentioned problems. The present invention aims to realize, for example, the easiness of the starting and a change of a mode of an image pickup apparatus to make it possible to perform a photographing action rapidly.

For settling the above-mentioned problems to achieve the object, according to a first aspect of the present invention, an image pickup apparatus including a first mode for picking up an object image and a second mode for reproducing a recorded image, comprises:

an operation member which is switched to the first mode according to an operation to a first position, and is switched to the second mode according to an operation to a second position, and further is suppressed to a third position during a period of time except for the operations; and control means for changing control to the image pickup apparatus according to a current mode and the position to which the operation member is operated.

Moreover, according to a second aspect of the present invention, a control method of an image pickup apparatus including a first mode for picking up an object image and a second mode for reproducing a recorded image, comprises: the step of operating an operation member which is switched to the first mode for picking up an object image according to an operation to a first position, and is switched to the second mode for reproducing a recorded image according to an operation to a second position, and further is suppressed to a third position during a period of time except for the operations; and the step of changing control to the image pickup apparatus according to a current mode and the position to which the operation member is operated.

Moreover, according to a third aspect of the present invention, a storage medium stores a program for executing the control method.

The other objects and features of the present invention will be clear from the following descriptions and the attached drawings.

BRIEF DESCRIPTION OF THE DRAWINGS

FIGS. 3A and 3B are perspective views showing the external appearance of the image pickup apparatus schematically as seen from the front thereof, in which FIG. 3A shows the withdrawal state of a lens barrel and FIG. 3B shows the feeding state of the lens barrel in the forward direction;

FIGS. 4A, 4B and 4C are explanatory views showing operation states of a mode change lever, an electric power off button and a color light emitting diode (LED), in which FIG. 4A shows a state before a mode change, in which the electric power is off and the color LED is not lighted, FIG. 4B shows a photographing mode state in which the electric power is on and the color LED is lighted in a red color, and FIG. 4C shows a reproduction mode state in which the electric power is on and the color LED is lighted in a blue color;

FIG. 10 is a flowchart showing a mode change processing procedure caused by mode change lever operations.

DETAILED DESCRIPTION OF THE PREFERRED EMBODIMENTS

Hereinafter, the attached drawings are referred to while the preferred embodiments of an image pickup apparatus, an image pickup method, and a recording medium according to the present invention are described.

First Embodiment

Figures 1, 1A:
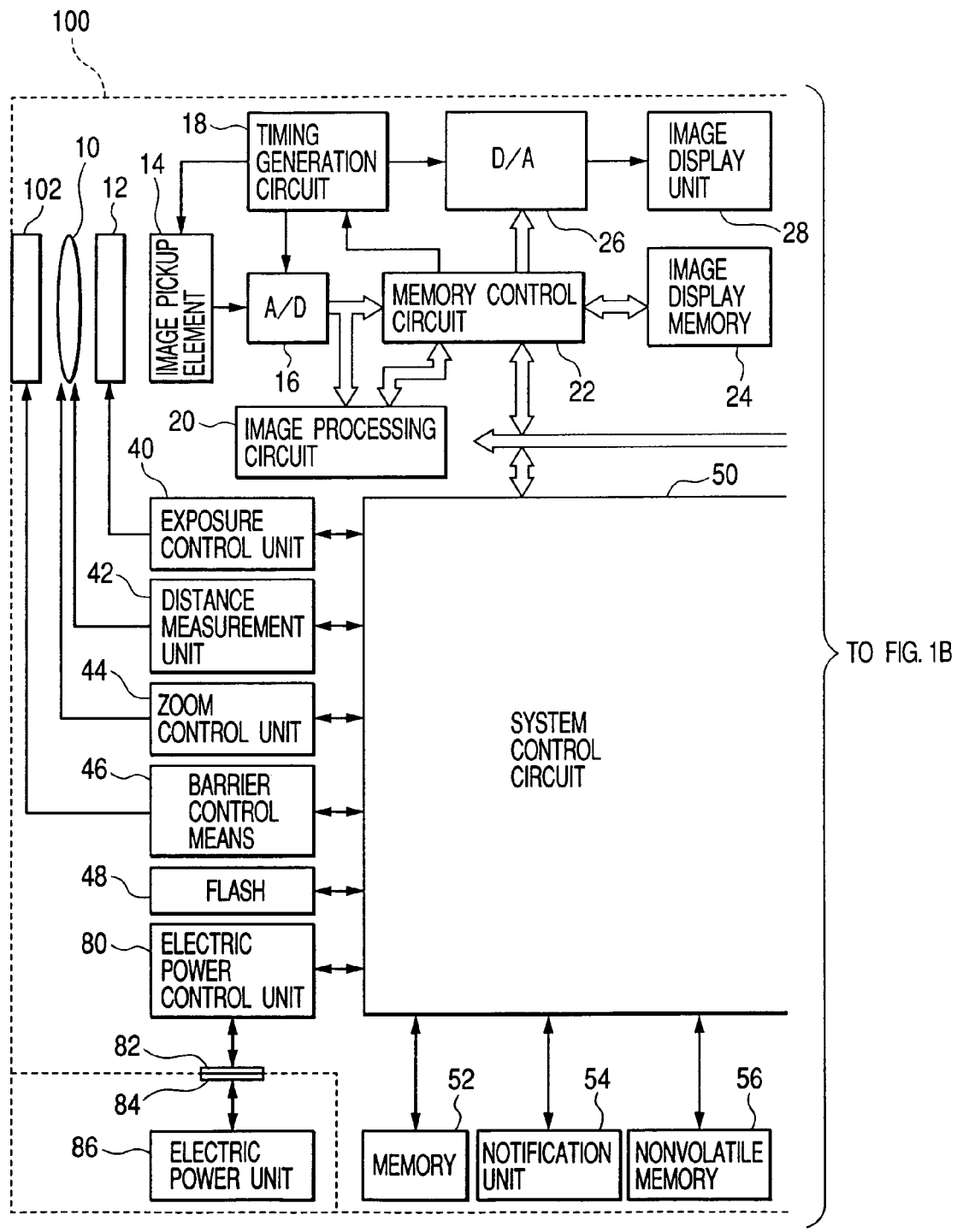
FIG. 1 is comprised of FIGS. 1A and 1B showing block diagrams showing the configuration of the principal part of an image pickup apparatus according to an embodiment.
Figure 1B:
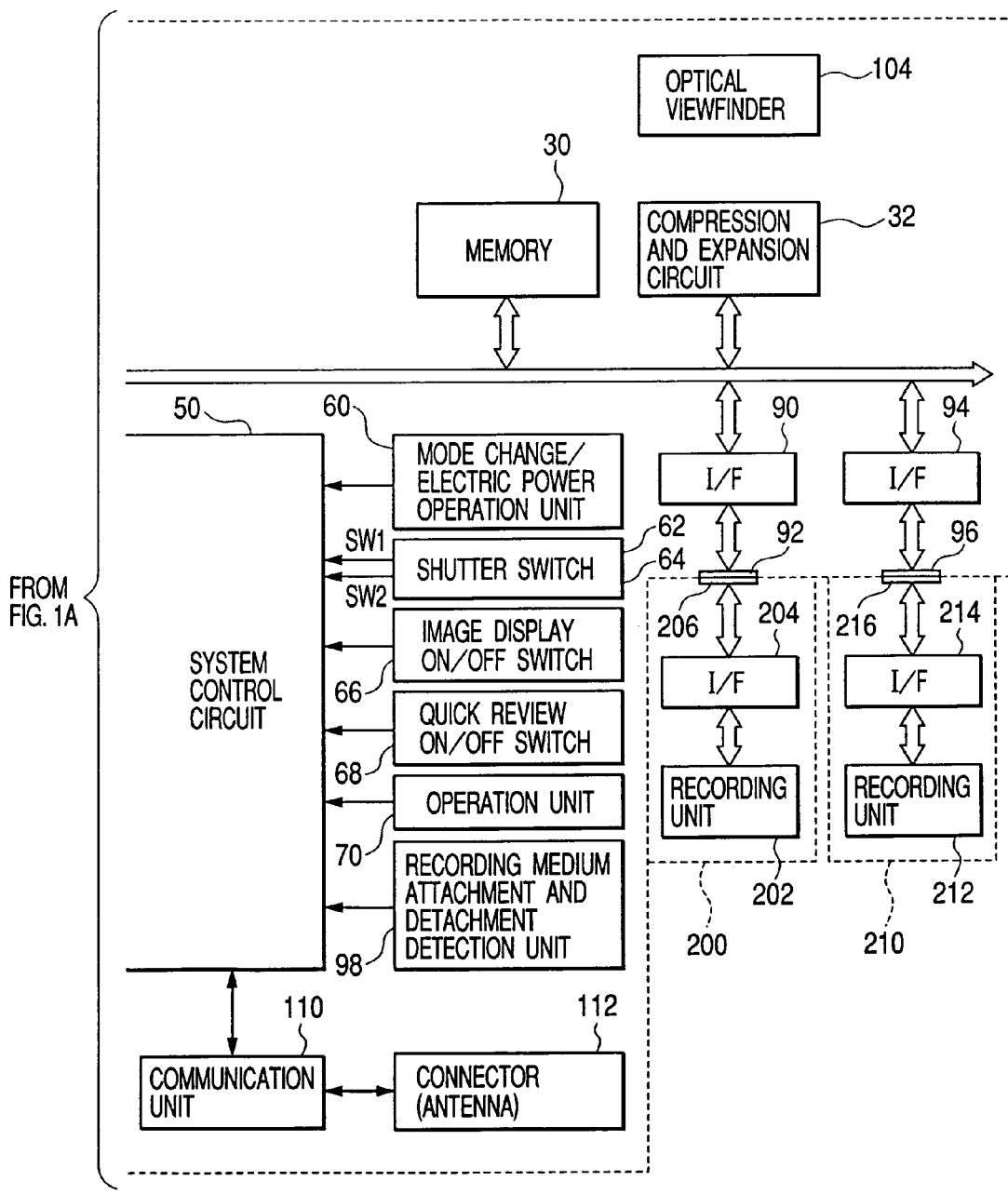

FIGS. 1A and 1B are block diagrams showing the configuration of the principal part of the image pickup apparatus according to the present invention.

In FIGS. 1A and 1B, a reference numeral 100 designates an image processing apparatus.

A reference numeral 10 designates a photographing lens. A reference numeral 12 designates a shutter equipped with an iris function. A reference numeral 14 designates an image pickup element for converting an optical image into an electric signal. A reference numeral 16 designates an analog-to-digital (A/D) converter for converting an analog signal output from the image pickup element 14 to a digital signal.

A reference numeral 18 designates a timing generation circuit for supplying clock signals and control signals to the image pickup element 14, the A/D converter 16 and a digitalto-analog (D/A) converter 26. The timing generation circuit 18 is controlled by a memory control circuit 22 and a system control circuit 50.

A reference numeral 20 designates an image processing circuit. The image processing circuit 20 performs predetermined pixel interpolation processing and color conversion processing of the data from the A/D converter 16 and of the data from the memory control circuit 22.

Moreover, the image processing circuit 20 performs predetermined operation processing by the use of imaged image data, and the system control circuit 50 performs through the lens (TTL) method control of auto focus (AF) processing, automatic exposure (AE) processing, ex-flashing (EF) processing and the like onto an exposure control unit 40 and a distance measurement unit 42 on the basis of the obtained operation results of the image processing circuit 20.

Moreover, the image processing circuit 20 also performs a predetermined operation processing by the use of the pick-up image data to perform TTL method auto white balance (AWB) processing on the basis of the obtained operation results.

The reference numeral 22 designates the memory control circuit for controlling the A/D converter 16, the timing generation circuit 18, the image processing circuit 20, an image display memory 24, the D/A converter 26, a memory 30 and a compression and expansion circuit 32.

Data of the A/D converter 16 is written in the image display memory 24 or the memory 30 through the image processing circuit 20 and the memory control circuit 22 or directly through the memory control circuit 22.

The reference numeral 24 designates the image display memory, and the reference numeral 26 designates the D/A converter. A reference numeral 28 designates an image display unit composed of a thin-film transistor (TFT) liquid crystal display (LCD) or the like. The image data for display which is written in the image display memory 24 is displayed on the image display unit 28 through the D/A converter 26.

By the sequential display of the imaged image data by the use of the image display unit 28, it is possible to realize the function of an electronic finder.

Moreover, the display of the image display unit 28 can be arbitrarily turned on or off by instructions from the system control circuit 50. When the display is off, the electric power consumption of the image processing apparatus 100 can be greatly reduced.

The reference numeral 30 designates the memory for storing photographed static images and moving images. The memory 30 is equipped with a storage capacity sufficient for storing a predetermined number of static images or moving images for a predetermined time.

Thereby, it becomes possible to write extensive images to the memory 30 at a high speed even in case of continuous photographing or a panoramic photographing, in which a plurality of static images are continuously photographed.

Moreover, the memory 30 can be used also as a work area of the system control circuit 50.

The reference numeral 32 designates the compression and expansion circuit for compressing or expanding image data by means of adaptive discrete cosine transform coding (ADCT) or the like. The compression and expansion circuit 32 reads the images stored in the memory 30 thereinto to perform the compression processing or the expansion processing of the images, and writes the processed data into the memory 30.

The reference numeral 40 designates the exposure control unit for controlling the shutter 12 equipped with the iris function. The exposure control unit 40 has also a flash light control function in cooperation with a flash 48.

The reference numeral 42 designates the distance measurement unit for controlling the focusing of the photographing lens 10. A reference numeral 44 designates a zoom control unit for controlling the zooming of the photographing lens 10. A reference numeral 46 designates barrier control means for controlling the operation of protection means 102 as a barrier.

The reference numeral 48 designates the flash. The flash 48 has also the projection function of an AF auxiliary beam and the flash light control function.

The exposure control unit 40 and the distance measurement unit 42 are controlled in conformity with the TTL method. The system control circuit 50 performs the control of the exposure control unit 40 and the distance measurement unit 42 on the basis of results operation which the image processing circuit 20 performs on imaged image data.

The reference numeral 50 designates the system control circuit for controlling the whole image processing apparatus 100. A reference numeral 52 designates a memory for storing constants, variables, programs and the like for the operation of the system control circuit 50.

A reference numeral 54 designates a notification unit composed of a liquid crystal display, a speaker and the like for displaying operation states, messages and the like by the use of letters, images, voices and the like according to the execution of programs in the system control circuit 50. The notification unit 54 is set at one or a plurality of easily visible positions near to an operation unit 70 of the image processing apparatus 100. The notification unit 54 is configured by, for example, a combination of an LCD, an LED, a sounding element and the like.

Moreover, a part of the functions of the notification unit 54 is set in an optical viewfinder 104.

The notification unit 54 displays the following display contents on the LCD and the like among the display contents of the notification unit 54: the display of single-shot/continuous photographing, the display of a self-timer, the display of compressibility, the display of the number of recorded pixels, the display of the number of recorded sheets, the display of the number of residual photographable sheets, the display of a shutter speed, the display of an iris value, the display of exposure correction, the display of a flash, the display of red-eye reduction, the display of macro-photographing, the display of the setting of a buzzer, the display of the residual quantity of the battery for a clock, the display of the residual quantity of batteries, the display of an error, the display of information by means of numbers of a plurality of figures, the display of the attachment and detachment states of recording media 200 and 210, the display of communication interface (I/F) operation, the display of date/time, and the like.

Moreover, the notification unit 54 displays the following display contents in the optical viewfinder 104 among the display contents of the notification unit 54: the display of focusing, the display of a camera-shake warning, the display of flash charging, the display of a shutter speed, the display of an iris value, the display of exposure correction, and the like.

A reference numeral 56 designates a erasable/recordable nonvolatile memory which can be electrically erased or can electrically record. As the nonvolatile memory 56, for example, an electrically erasable programmable read-only memory (EEPROM) is used.

Reference numerals 60, 62, 64, 66, 68 and 70 designate operation means for inputting various operation instructions of the system control circuit 50. The operation means are composed of a combination of a single or a plurality of switches, dials, touch panels, pointing based on a detected ray, voice recognition apparatus and the like.

Hereupon, detailed descriptions of these operation means will be given.

The reference numeral 60 designates a mode change/electric power operation unit capable of turning on and off the electric power and setting each functional mode among an automatic photographing mode, a photographing mode, a panorama photographing mode, a reproduction mode, a multi-screen reproduction/erase mode, a personal computer (PC) connection mode and the like.

A reference numeral 62 designates a shutter switch SW1. The shutter switch 62 is turned on at a halfway point of an operation of a shutter button (not shown), to instruct the starting of the operation of AF processing, AE processing, AWB processing, EF processing and the like.

The reference numeral 64 designates a shutter switch SW2. The shutter switch 64 is turned on at the completion of an operation of the shutter button (not shown), to instruct the starting of a series of processings of exposure processing for writing the image data of a signal read from the image pickup element 12 into the memory 30 through the A/D converter 16 and the memory control circuit 22, development processing using the operations of the image processing circuit 20 and the memory control circuit 22, and recording processing of reading image data from the memory 30 to compress the read image data with the compression and expansion circuit 32 and writing the compressed image data into the recording medium 200 or 210.

The reference numeral 66 designates an image display on/off switch capable of setting the on/off of the image display unit 28.

Owing to this function, it is possible to achieve the saving of electric power consumption by cutting off the current supply to the image display unit composed of the TFT LCD or the like when the photographing using the optical viewfinder 104 is performed.

The reference numeral 68 designates a quick review on/off switch for setting a quick review function for automatically reproducing photographed image data immediately after the photographing. Incidentally, in the present embodiment, it is supposed that the quick review on/off switch 68 has the function of setting the quick review function especially in the case where the image display unit 28 is made to be off.

The reference numeral 70 designates an operation unit composed of various buttons, touch panels and the like. The operation unit 70 includes a menu button, a set button, a macro-button, a multi-screen reproduction page break button, a flash setting button, a single-shot/continuous photographing/self-timer change button, a menu shift plus (+) button, a menu shift minus (−) button, a reproduction image shift plus (+) button, a reproduction image shift minus (−) button, a photographing image quality selection button, an exposure correction button, a date/time setting button, an image deletion button, an image deletion cancel button, and the like.

A reference numeral 80 designates an electric power control unit composed of a battery detection circuit, a direct-current to direct-current (DC-DC) converter, a switch circuit for switching a block to be conducted, and the like. The electric power control unit 80 detects the existence of attached batteries, the kinds of the batteries, and the residual charges of the batteries, and controls the DC-DC converter on the basis of the detection results and the instructions of the system control circuit 50 to supply necessary voltages to each unit including the recoding media 200 and 210 for necessary periods.

A reference numeral 82 designates a connector. A reference numeral 84 designates a connector. A reference numeral 86 designates an electric power unit composed of a primary battery such as an alkaline battery, a lithium battery or the like, a secondary battery such as a nickel cadmium (NiCd) battery, a nickel metal hydride (NiMH) battery, a lithium (Li) battery or the like, an alternating current (AC) adapter or the like.

Reference numerals 90 and 94 designate interfaces with recording media such as a memory card, a hard disk and the like. Reference numerals 92 and 96 designate connectors for connecting the image processing apparatus 100 with the recording media such as the memory card, the hard disk and the like. A reference numeral 98 designates a recording medium attachment and detachment detection unit for detecting whether or not the recording medium 200 or 210 is attached to the connectors 92 and/or 96.

Incidentally, in the present embodiment, descriptions are made on the supposition that two channels of the interfaces 90 and 94 and the connectors 92 and 96 to which the recording media 200 and 210 are attached are provided. It is needless to say that any configuration of the invention may be used, in which the number of channels of the interfaces and the connectors to which the recording media are attached is single or plural. Moreover, the present invention may be configured to have a combination of pairs of interfaces and connectors having different standards in respective pairs.

The present invention may be configured to use the interfaces and the connectors in conformity with the standards of Personal Computer Memory Card International Association (PCMCIA) cards, Compact Flash (CF (R)) cards, or the like as the interfaces 90 and 94 and the connectors 92 and 96.

Moreover, when the interfaces 90 and 94 and the connectors 92 and 96 are configured to use the interfaces and the connectors in conformity with the standards of the PCMCIA cards, the CF (R) cards or the like, it is possible to communicate image data and management information attached to the image data with other computers and peripheral equipment such as printers and the like by the connection of various communication cards such as a local area network (LAN) card, a modem card, a unified s band (USB) card, an Institute of Electrical and Electronic Engineers (IEEE) 1394 card, a P 1284 card, a small computer system interface (SCSI) card, a communication card of the personal handy-phone system (PHS) or the like, and the like.

The reference numeral 102 designates the protection means as a barrier for preventing the pollution or the damage of the image pickup unit including the lens 10 of the image processing apparatus 100 by covering the image pickup unit.

The reference numeral 104 designates the optical viewfinder. It is possible to perform photographing by the use of only the optical viewfinder 104 without using the electronic finder function rendered by the image display unit 28. Moreover, in the optical viewfinder 104, a part of the functions of the notification unit 54 such as the display of focusing, the display of a camera-shake warning, the display of flash charging, the display of a shutter speed, the display of an iris value, the display of exposure correction, and the like is set.

A reference numeral 110 designates a communication unit having various communication functions such as Reed-Solomon (RS) code 232C, USB, IEEE 1394, P 1284, SCSI, a modem, a LAN, wireless communication, and the like.

A reference numeral 112 designates a connector (or an antenna in case of wireless communication) for connecting the image processing apparatus 100 with other equipment through the communication unit 110.

The reference numeral 200 designates the recording medium such as a memory card, a hard disk or the like. The recording medium 200 includes a recording unit 202 composed of a semiconductor memory, a magnetic disk or the like, an interface 204 with the image processing apparatus 100, and a connector 206 for the connection with the image processing apparatus 100.

The reference numeral 210 designates the recording medium such as a memory card, a hard disk or the like. The recording medium 210 includes a recording unit 212 composed of a semiconductor memory, a magnetic disk or the like, an interface 214 with the image processing apparatus 100, and a connector 216 for the connection with the image processing apparatus 100.

Figure 2:
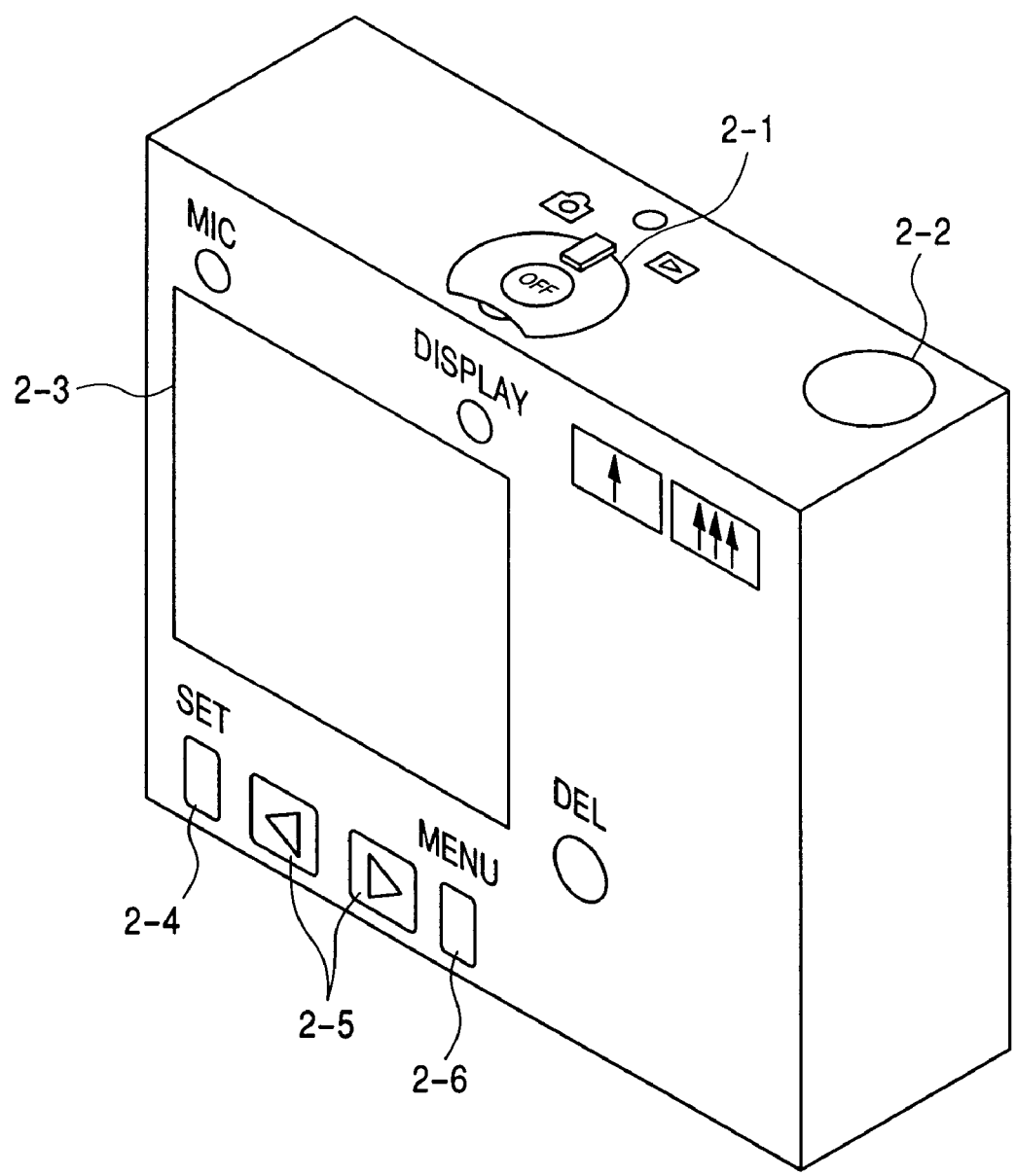
FIG. 2 is a perspective view showing an external appearance of the image pickup apparatus schematically as seen from the rear thereof.

FIG. 2 is a perspective view showing an external appearance of the image pickup apparatus according to the present invention schematically as seen from the rear thereof.

In FIG. 2, a reference numeral 2-1 designates a mode change lever and an electric power off button (corresponding to the mode change/electric power operation unit 60 in FIGS. 1A and 1B). The mode change lever and the electric power off button 2-1 are operation members for performing a change of modes such as a reproduction mode, a photographing mode and the like and for performing turning on/off of the electric power. A reference numeral 2-2 designates a shutter button (corresponding to the shutter switches 62 and 64 in FIGS. 1A and 1B). The shutter button 2-2 is a button used for photographing. An photographed image by the camera is displayed on the image display unit 28. Because the image display unit 28 ordinarily uses an LCD, the image display unit 28 is designated as an LCD 2-3 in FIG. 2. When a static image and/or a moving image are reproduced, they are displayed on the LCD 2-3.

An SET button 2-4, left and right buttons 2-5, and a menu button 2-6 are buttons to be used for a change of photographing parameters in the photographing mode, the viewing of an image in the reproduction mode, and the like.

Figure 3A:
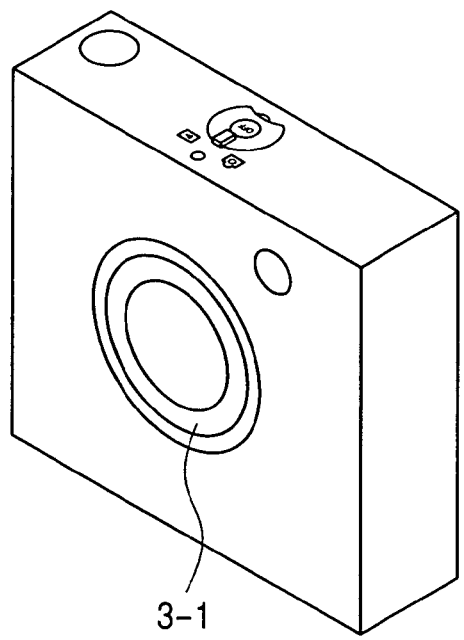
Figure 3B:
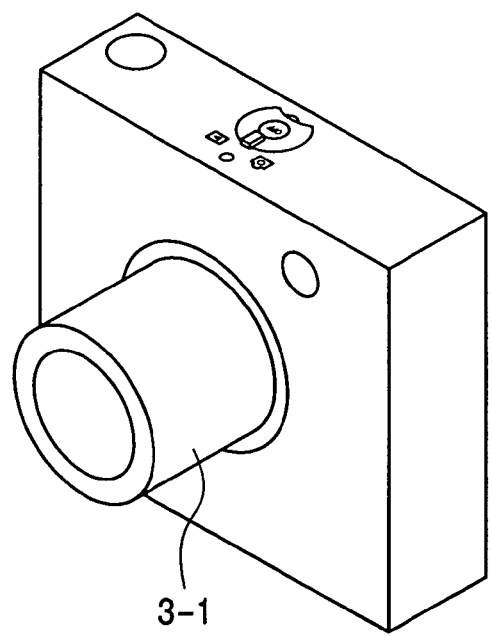

FIGS. 3A and 3B are perspective views showing the external appearance of the image pickup apparatus according to the present invention schematically as seen from the front thereof.

In FIGS. 3A and 3B, a reference numeral 3-1 designates a lens barrel (or a barrel) for holding the photographing lens 10. In the case where the power source is off, and the like, the barrel 3-1 is in its withdrawal state (FIG. 3A). When photographing is performed, as shown in FIG. 3B, the barrel 3-1 is fed forward.

Figure 4A:
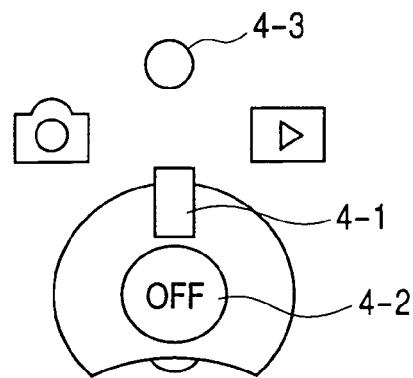
Figure 4B:
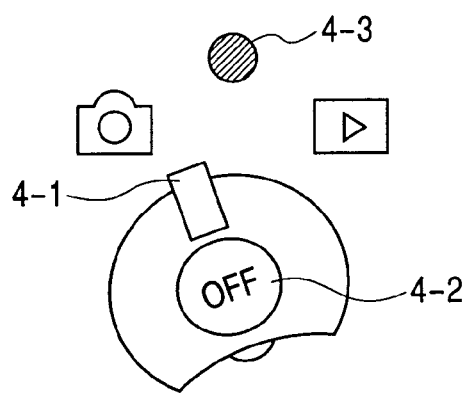
Figure 4C:
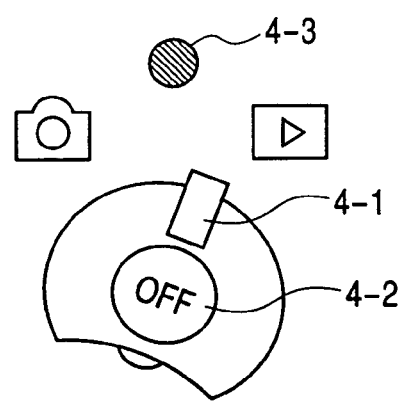

FIGS. 4A, 4B and 4C are explanatory views showing operation states of a mode change lever, an electric power off button and a color LED. FIG. 4A shows a state before a mode change, in which the electric power is off and the color LED is not lighted. FIG. 4B shows a photographing mode state in which the electric power is on and the color LED is lighted in a red color. FIG. 4C shows a reproduction mode state in which the electric power is on and the color LED is lighted in a blue color.

In FIGS. 4A, 4B and 4C, a reference numeral 4-1 designates the mode change lever for changing the modes. The mode change lever 4-1 is ordinarily located at a position shown in FIG. 4A. When the mode change lever 4-1 is turned to the position where a character on the left side is drawn (FIG. 4B), the operation mode of the digital camera is shifted to the photographing mode for photographing an object image. When the change lever 4-1 is turned to the position where a character on the right side is drawn (FIG. 4C), the operation mode of the digital camera is shifted to the reproduction mode for reproducing a recorded image in the recording medium 200 or 210. The mode change lever 4-1 is suppressed by means of the force of springs (not shown) at the intermediate position between the characters on both of the left and the right sides (FIG. 4A) as long as an operator does not operate the mode change lever 4-1. Consequently, the mode change lever 4-1 returns to the intermediate position (FIG. 4A) after being turned to the left or the right position by the operator. Moreover, the mode change lever 4-1 is also used as a switch for turning on the power source of the digital camera. When the mode change lever 4-1 is turned to the left side or the right side in the state in which the electric power is off, the electric power is turned on, and the digital camera is started in a mode corresponding to the position where the mode change lever 4-1 is turned (the photographing mode or the reproduction mode). A reference numeral 4-2 designates an electric power off button for turning off the electric power. When the electric power off button 4-2 is depressed, the electric power is turned off regardless of whether the digital camera is in the photographing mode or the reproduction mode. A reference numeral 4-3 designates a color LED indicating the current state. When the color LED 4-3 is not lighted, the state indicates that the electric power is off. When the color LED 4-3 is lighted in a red color, the state indicates the photographing mode. When the color LED 4-3 is lighted in a blue color, the state indicates the reproduction mode.

Figure 5:
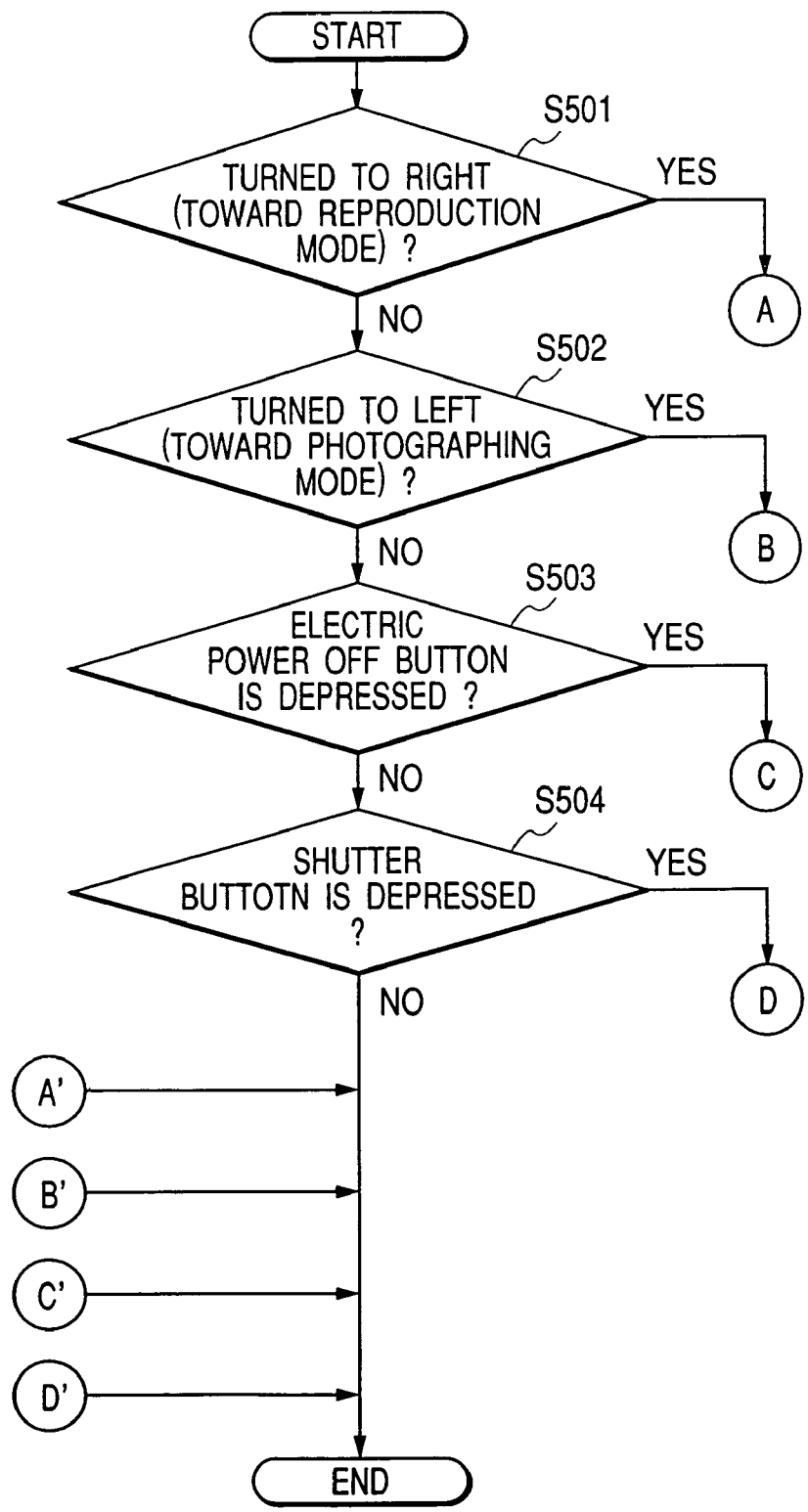
FIG. 5 is a flowchart showing a processing procedure based on the operations of the mode change lever, the electric power off button, and a shutter button.
Figure 6:
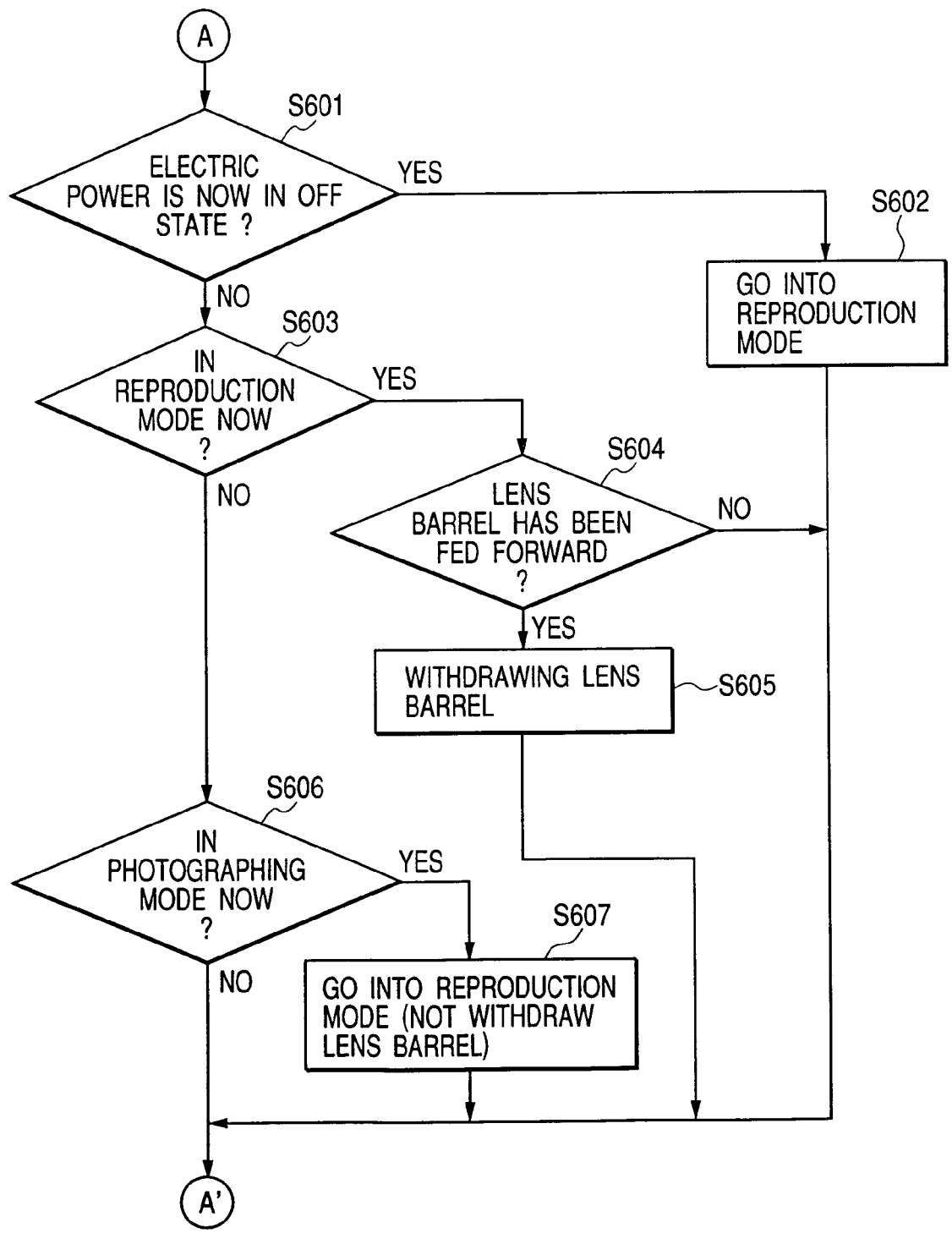
FIG. 6 is a flowchart showing a processing procedure in the case where the mode change lever is turned in the direction of a reproduction mode.
Figure 7:
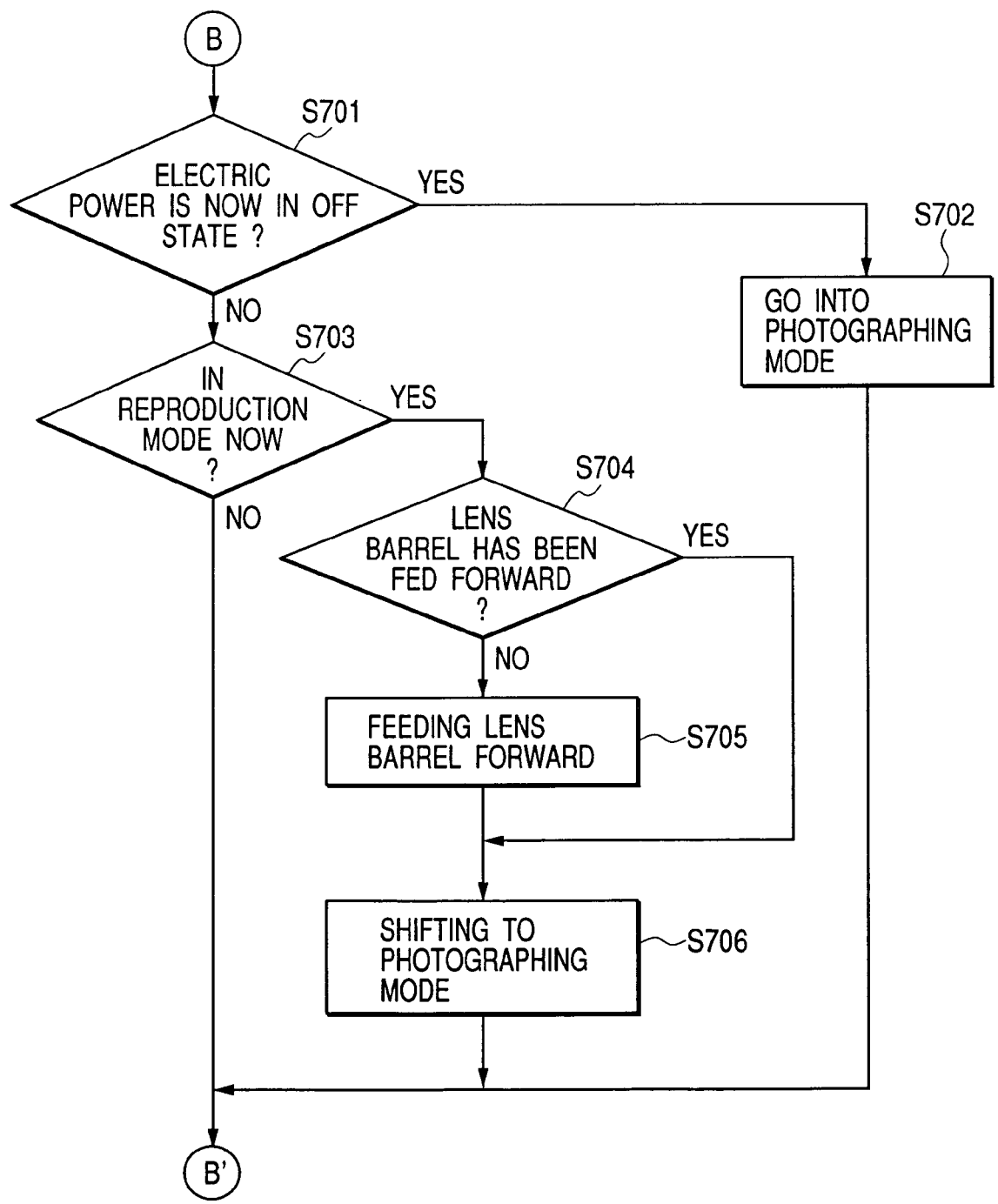
FIG. 7 is a flowchart showing a processing procedure in the case where the mode change lever is turned in the direction of a photographing mode.
Figure 8:
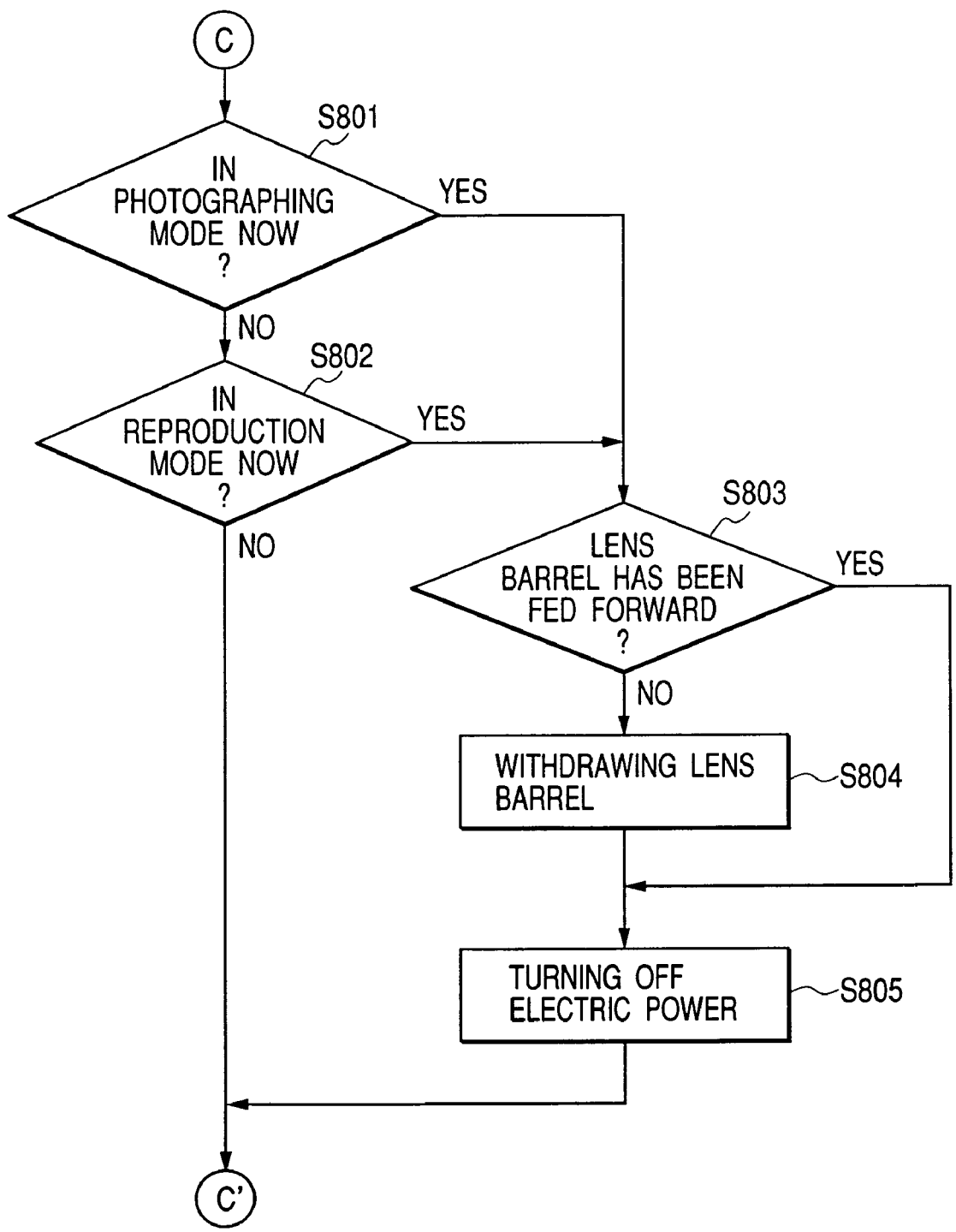
FIG. 8 is a flowchart showing a processing procedure in the case where an electric power off button is depressed.
Figure 9:
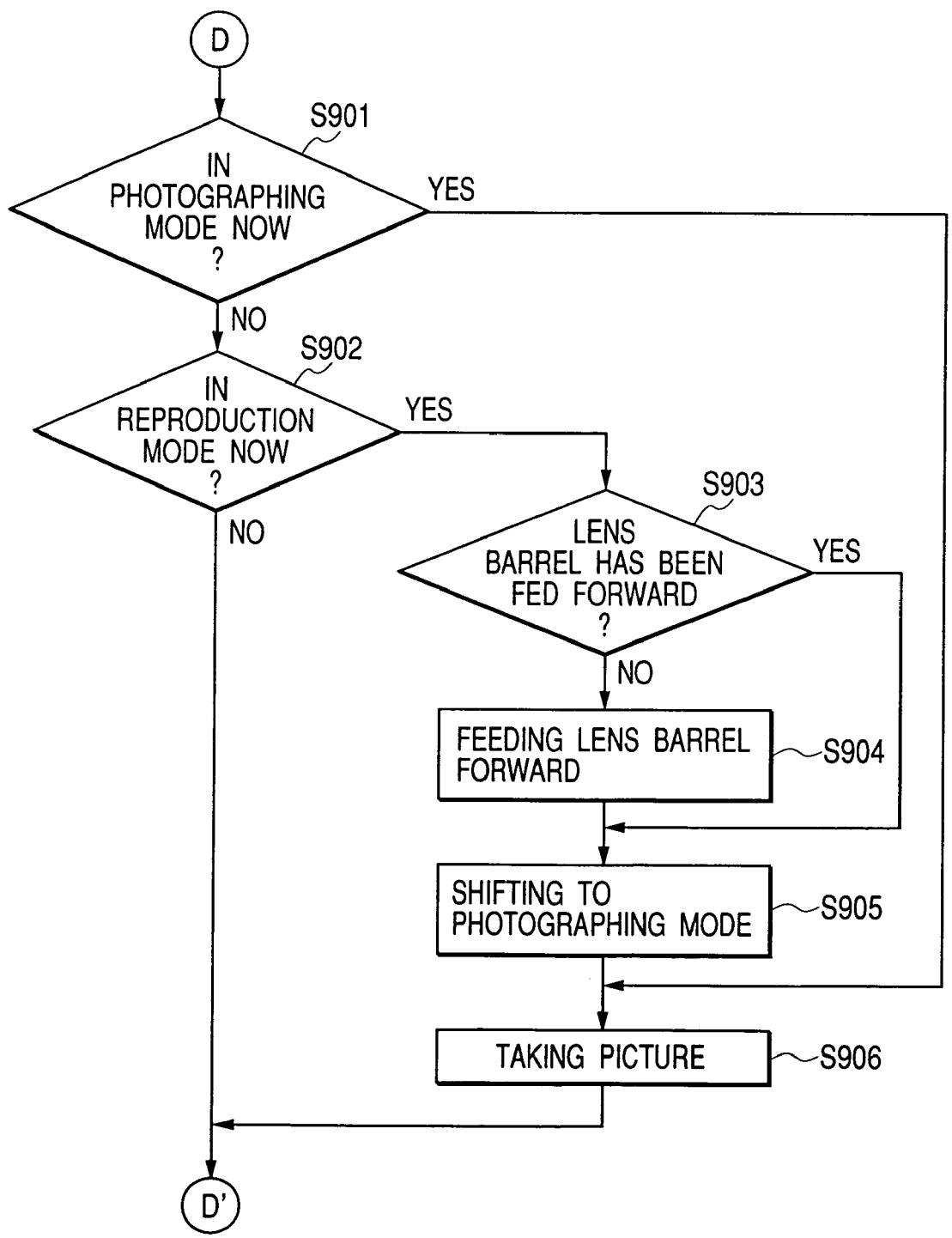
FIG. 9 is a flowchart showing a processing procedure in the case where the shutter button is depressed.

FIG. 5 is a flowchart showing a processing procedure based on the operations of the mode change lever 4-1, the electric power off button 4-2, and the shutter button 2-2; FIG. 6 is a flowchart showing a processing procedure in the case where the mode change lever 4-1 is turned in the direction of the reproduction mode; FIG. 7 is a flowchart showing a processing procedure in the case where the mode change lever 4-1 is turned in the direction of the photographing mode; FIG. 8 is a flowchart showing a processing procedure in the case where the electric power off button 4-2 is made to be off; and FIG. 9 is a flowchart showing a processing procedure in the case where the shutter button 2-2 is depressed. Incidentally, the processing procedures shown in FIGS. 5-9 are processed by the system control circuit 50.

In FIGS. 5, 6, 7, 8 and 9, when the mode change lever 4-1 is tuned to the right side reproduction direction (Step S501), the image pickup apparatus is started in the reproduction mode (Step S602 in FIG. 6) in the case where the current state of the image pickup apparatus is the off state of the electric power thereof (Step S601). In the case where the current state is the reproduction mode (Step S603) and the lens barrel 3-1 is fed forward (Step S604), the lens barrel 3-1 is withdrawn for raising operability in the reproduction mode (Step S605). On the other hand, in the case where the current state is the photographing mode (Step S606), the image pickup apparatus shifts to the reproduction mode thereof, but the system control circuit 50 controls the lens barrel 3-1 not to be withdrawn because there is the possibility of performing photographing at once again (Step S607).

When the mode change lever 4-1 is tuned to the left side photographing direction (Step S502), the image pickup apparatus is started in the photographing mode (Step S702) in the case where the current state of the image pickup apparatus is in the off state of the electric power thereof (Step S701). In the case where the current state is the reproduction mode (Step S703) and the lens barrel 3-1 is not fed forward (Step S704), the lens barrel 3-1 is fed forward (Step S705), and the image pickup apparatus shits to the photographing mode (Step S706).

When the electric power off button 4-2 is depressed (Step S503), and when the lens barrel 3-1 is fed forward (Step S803), the lens barrel 3-1 is withdrawn (Step S804), and the electric power of the image pickup apparatus is turned off (S805) whether the current state thereof is the photographing mode (Step S801) or whether the current state thereof is the reproduction mode (Step S802).

When the shutter button 2-2 is depressed (Step S504), the photographing is performed as it is, if the current state of the image pickup apparatus is the photographing mode (S901). However, in the case where the current state of the image pickup apparatus is the reproduction mode (Step S903), the lens barrel 3-1 is fed forward (Step S904) if the lens barrel 3-1 is not fed forward (Step S903). And then, the image pickup apparatus shifts to the photographing mode (Step S905) to perform photographing (Step S906).

As described above, because the control of the image pickup apparatus is changed according to the present mode thereof and the position of the mode change lever 4-1, a user can perform suitable operations to each mode rapidly.

To put it concretely, one operation of the mode change lever 4-1 makes it possible to start up the image pickup apparatus from the electric power off state in the mode which the user wants to start (the reproduction mode or the photographing mode). The system makes it possible to shorten the mode selection operations at starting in comparison with the conventional system in which the electric power operations and the mode operations are performed separately.

Moreover, because the mode change lever 4-1 returns to the original position thereof after a change of a mode, the mode change lever 4-1 does not specify a mode position. By an operation of the depression of the shutter button 2-2 or the like, the image pickup apparatus shifts to the photographing mode from the reproduction mode, and consequently it is possible to perform the control of the image pickup apparatus independent of the modes thereof. Because photographing is performed by the depression of the shutter button 2-2 from the reproduction mode without any change of the modes, it is possible to shorten the period of time from the reproduction mode to actual photographing. Consequently, a remarkable effect can be obtained.

Moreover, when the user wants to perform photographing at once after entering into the reproduction mode, it is possible to prepare the next photographing with the lens barrel 3-1 fed forward. When the user regards the lens barrel 3-1 fed forward as a hindrance in the reproduction mode, the user can withdraw the lens barrel 3-1. The user can withdraw the lens barrel 3-1 at any time when he or she wants it. Consequently, the operability of the image pickup apparatus is improved, and the improvement of the operability can be realized without providing a dedicated member for withdrawing the lens barrel 3-1.

Second Embodiment

There can be the case where the photographing mode includes two photographing modes of a still image photographing mode and a moving image photographing mode and the reproducing mode includes a single reproducing mode for reproducing and displaying only one image on the LCD 2-3 and a multi image reproduction mode for reproducing and displaying a plurality of images at a time.

FIG. 10 is a flowchart showing a mode change processing procedure caused by mode change lever operations. The other configurations of the second embodiment are the same as those of the first embodiment.

In FIG. 10, when the mode change lever 4-1 is turned to the left side photographing mode character position (Step S1001) and when the current state is the still image photographing mode (Step S1002), the mode of the image pickup apparatus is switched to the moving image photographing mode thereof (Step S1003). On the other hand, when the current state of the image pickup apparatus is the reproduction mode thereof (Step S1004), the mode of the image pickup apparatus is switched to the still image photographing mode (Step S1005).

Moreover, when the mode change lever 4-1 is turned to the right side reproduction mode character position (Step S1006) and when the current state of the image pickup apparatus is the single reproduction mode thereof for reproducing images one by one (Step S1007), the mode of the image pickup apparatus is switched to the multi image reproduction mode (Step S1008).

On the other hand, when the current state of the image pickup apparatus is the photographing mode thereof (Step S1009), the mode of the image pickup apparatus is switched to the single reproduction mode thereof (Step S1010).

Moreover, by turning the mode change lever 4-1 to the photographing mode direction again when the image pickup apparatus is in the photographing mode, it is possible to shift the image pickup apparatus to a photographing mode for recording images in different photographing conditions or file formats such as moving image, panorama image and the like.

Moreover, by tuning the mode change lever 4-1 to the reproduction mode direction again when the image pickup apparatus is in the reproduction mode, it is possible to shift the image pickup apparatus to a reproduction mode for reproducing images in different formats such as multi image display or the like.

Incidentally, in the first and the second embodiments, mode changes are performed by the turning of the mode change lever 4-1 to the reproduction mode direction or the photographing mode direction, but the similar mode changes may be realized by the configuration composed of the state of a button depressed slightly and the state of the button depressed long.

Other Embodiments

The scope of the present invention includes the configuration in which a program code of software for realizing the functions of the above-described embodiments is supplied to a computer in an apparatus or a system which is connected to various devices for making the various devices operate to realize the functions of the above-described embodiments, and in which the above-mentioned various devices are operated in accordance with the program stored in the computer (a central processing unit (CPU) or a micro processing unit (MPU)) of the system or the apparatus.

Moreover, in this case, the program code of the software itself realizes the functions of the above-described embodiments, and consequently the program code itself constitutes the present invention. As a transmission medium of the program code, a communication medium (wired lines such as optical fibers or the like, wireless lines or the like) in a computer network (a LAN, a wide area network (WAN) such as the Internet or the like, a wireless communication network or the like) system for supplying program information by transmitting the program information as a carrier wave can be used.

Moreover, means for supplying the program code to the computer such as a recording medium storing the program code constitutes the present invention.

Moreover, it is needless to say that the program code constitutes the present invention not only in the case where the functions of the above-mentioned embodiments are realized by the execution of the supplied program code by the computer, but also in the case where the functions of the above-mentioned embodiments are realized by the cooperation of the program code with the operating system (OS) working on the computer, other application software or the like.

Moreover, it is needless to say that the present invention includes the case where the supplied program code is stored in a memory installed in a function expansion board of the computer or a function expansion unit connected to the computer before a CPU or the like installed in the function expansion board or the function expansion unit executes a part or the whole of actual processing in accordance with the instructions of the program code to realize the functions of the above-mentioned embodiments by the processing of the CPU or the like.

Incidentally, various forms and structures shown in the above-described embodiments are only concrete examples of the implementation of the present invention, and the scope of the present invention should not be limitedly interpreted by the forms and the structures. That is, the present invention can be implemented in various forms without departing from the sprit or the principal features thereof.

What is claimed is:

1. An image pickup apparatus including a first mode for picking up an object image and a second mode for reproducing a recorded image, said apparatus comprising:
    a first operation member which is operable toward a first position corresponding to the first mode, and is operable toward a second position corresponding to the second mode, and further itself is automatically forced to be suppressed to a third position different from each of the first position and the second position when said first operation member is not operated by a user;
    a second operation member different from said first operation member; and
    a control unit, which effects control of said image pickup apparatus so as to make said image pickup apparatus active in accordance with the mode corresponding to the position to which said first operation member is operated to one of the first position and the second position, if said first operation member is operated when said image pickup apparatus is in a non-active state, switch over the mode of said image pickup apparatus to the mode corresponding to the position to which said first operation member is operated, if said first operation member is operated to one of the first position and the second position when said image pickup apparatus is in an active state and the current mode of said image pickup apparatus is different from the mode corresponding to the position to which said first operation member is operated, and make said image pickup apparatus shift from the active state to the non-active state if said second operation member is operated when said image pickup apparatus is in the active state and said first operation member is positioned at the third position.

2. An image pickup apparatus according to claim 1, further comprising a photographing operation member operative to perform a photographing operation, wherein said control unit switches the second mode to said first mode without operating said first operation member, if said photographing operation member is operated when said image pickup apparatus is in the active state and the current mode of said image pickup apparatus is the second mode.

3. An image pickup apparatus according to claim 1, wherein said control unit withdraws a lens barrel according to the operation to the second position by means of said first operation member, when said lens barrel is fed forward in a state of the second mode.

4. A control method of an image pickup apparatus including a first mode for picking up an object image and a second mode for reproducing a recorded image that image pickup apparatus having a first operation member which is operable toward a first position corresponding to the first mode, and is operable toward a second position corresponding to the second mode, and further itself is automatically forced to be suppressed to a third position different from each of the first position and the second position when said first operation member is not operated by a user and a second operation member is different from said first operation member, said control method comprising:
    a control step effecting control of said image pickup apparatus so as to make said image pickup apparatus active in accordance with the mode corresponding to the position to which said first operation member is operated, if said first operation member is operated to one of the first position and the second position when said image pickup apparatus is in a non-active state, switch over the mode of said image pickup apparatus to the mode corresponding to the position to which said first operation member is operated, if said first operation member is operated to one of the first position and the second position when said image pickup apparatus is in an active state and the current mode of said image pickup apparatus is different from the mode corresponding to the position which said first operation member is operated, and make said image pickup apparatus shift from the active state to the non-active state if said second operation member is operated when said image pickup apparatus is in the active state and said first operation member is positioned at the third position.

5. A storage medium computer-readably storing a program comprising a program code for causing a computer to execute said control method of an image pickup apparatus according to claim 4.

6. An image pickup apparatus including a first image pickup mode for picking up an object image, a second image pickup mode for picking up an object image, a first image reproduce mode for reproducing a recorded image and a second image reproduce mode for reproducing a recorded image, said apparatus comprising:
    a first operation member which is operable toward a first position corresponding to the first and second image pickup mode, and is operable toward a second position corresponding to the first and second image reproduce mode, and further itself is automatically forced to be suppressed to a third position different from each of the first position and the second position when said operation member is not operated by a user;
    a second operation member different from said first operation member;
    a control unit which controls mode switching of said image pickup apparatus so as to switch over the mode thereof between the first pickup mode and the second pickup mode if said first operation member is operated to the first position when said image pickup apparatus is in one of the first image pickup mode and the second image pickup mode, switch over the mode of said image pickup apparatus to one of the first image reproducing mode and the second image reproducing mode if said first operation member is operated to the second position when said image pickup apparatus is in one of the first image pickup mode and the second image pickup mode, switch over the mode of said image pickup apparatus between the first image reproducing mode and the second image reproducing mode if said first operation member is operated to the second position when said image pickup apparatus is in one of the first image reproducing mode and the second image reproducing mode, switch over the mode of said image pickup apparatus to one of the first image pickup mode and the second image pickup mode if said first operation member is operated to the first position when said image pickup apparatus is in one of the first image reproducing mode and the second image reproducing mode, and make said image pickup apparatus shift from the active state into the non-active state if said second operation member is operated when said image pickup apparatus is in the active state and said first operation member is positioned at the third position.

7. A control method of an image pickup apparatus including a first image pickup mode for picking up an object image, a second image pickup mode for picking up an object image, a first image reproduce mode for reproducing a recorded image and a second image reproduce mode for reproducing a recorded image that image pickup apparatus having a first operation member which is operable toward a first position corresponding to the first mode, and is operable toward a second position corresponding to the second mode, and further itself is automatically forced to be suppressed to a third position different from each of the first position and the second position when said operation member is not operated by a user and a second operation member different from said first operation member, said control method comprising:

the step of controlling mode switching of said image pickup apparatus so as to switch over the mode thereof between the first pickup mode and the second pickup mode if said first operation member is operated to the first position when said image pickup apparatus is in one of the first image pickup mode and the second image pickup mode, switch over the mode of said image pickup apparatus to one of the first image reproducing mode and the second image reproducing mode if said first operation member is operated to the second position when said image pickup apparatus is in one of the first image pickup mode and the second image pickup mode, switch over the mode of said image pickup apparatus between the first image reproducing mode and the second image reproducing mode if said first operation member is operated to the second position when said image pickup apparatus is in one of the first image reproducing mode and the second image reproducing mode, switch over the mode of said image pickup apparatus to one of the first image pickup mode and the second image pickup mode if said first operation member is operated to the first position when said image pickup apparatus is in one of the first image reproducing mode and the second image reproducing mode, and make said image pickup apparatus shift from the active state into the non-active state if said second operation member is operated when said image pickup apparatus is in the active state and said first operation member is positioned at the third position.

* * * * *